United States Patent

[11] 3,558,144

| [72] | Inventors | Herbert O. Corbett<br>Cincinnati;<br>Raymond C. Karczewski, Carrollton, Ohio |
|---|---|---|
| [21] | Appl. No. | 846,786 |
| [22] | Filed | Aug. 1, 1969 |
| [45] | Patented | Jan. 26, 1971 |
| [73] | Assignee | National Distillers and Chemical Corporation<br>New York, N.Y.<br>a corporation of Virginia |

[54] MECHANICAL FLEXIBLE TELESCOPIC JOINT SEAL
8 Claims, 6 Drawing Figs.

[52] U.S. Cl. ................................................. 277/208,
285/344
[51] Int. Cl. ....................................................... F16j 15/06
[50] Field of Search .......................................... 277/204,
207 to 210 incl.; 285/231, 344, 345

[56] References Cited
UNITED STATES PATENTS

| 2,615,740 | 10/1952 | Nathan .......................... | 277/207(A) |
| 3,163,432 | 12/1964 | DeBoer .......................... | 277/209 |

FOREIGN PATENTS

| 386,149 | 4/1908 | France ......................... | 277/207 |
| 838,101 | 11/1938 | France ......................... | 285/345 |
| 661,265 | 8/1938 | Germany ..................... | 277/209 |

*Primary Examiner*—Laverne D. Geiger
*Assistant Examiner*—Robert I. Smith
*Attorney*—Allen A. Meyer, Jr.

ABSTRACT: A gasket for producing a fluidproof joint between a pair of telescoping elements, the gasket comprising a pair of spaced rings or beads connected by a substantially thinner web portion, all produced from flexible and compressible elastomeric material. Desirably the web portion is angularly disposed and merges with the upper circumferential periphery of one of the spaced rings and with the lower circumferential periphery of the other of said rings and the surfaces of the two rings and web are circumferentially knurled.

PATENTED JAN 26 1971
3,558,144
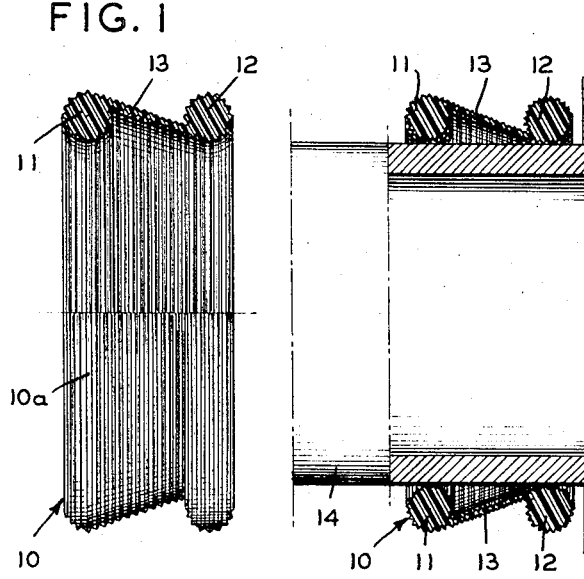
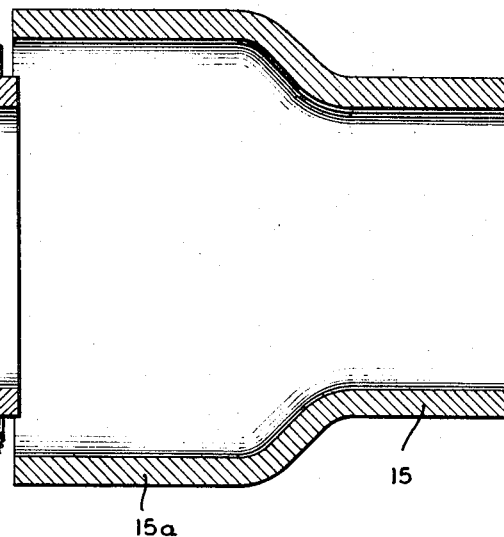
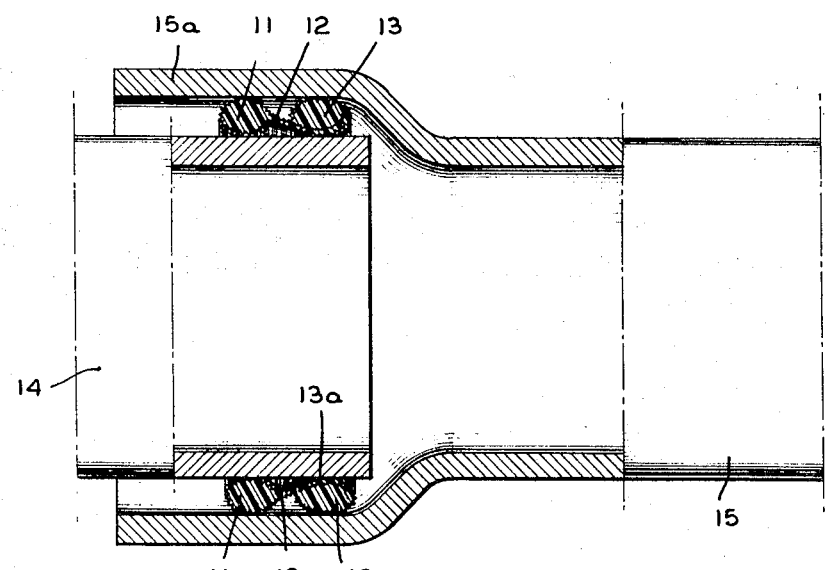
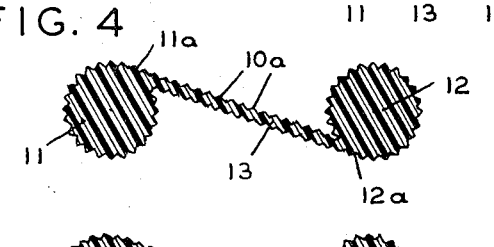
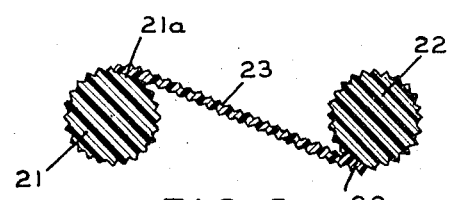
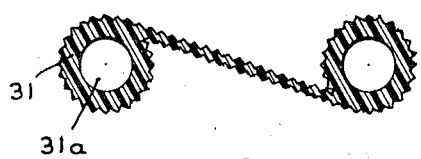
INVENTORS
HERBERT O. CORBETT
RAYMOND C. KARCZEWSKI
BY Allen A. Meyer, Jr.
ATTORNEY

MECHANICAL FLEXIBLE TELESCOPIC JOINT SEAL

This invention relates to a novel O-type ring gasket produced from neoprene rubber or similar elastomeric compound having requisite characteristics of flexibility and compressibility.

It is a particular object of the present invention to provide a gasket having utility in such fields as the creation of fluidproof joints between adjacent pipe sections where the extremity of one section is received telescopically within the enlarged or belled extremity of the adjacent section, the arrangement being such that a unique deformation of the gasket will occur during the telescopic assembly, thereby providing a completely fluidproof joint with an ease heretofore unknown in this art.

It is a further object of the invention to provide a novel gasket of the class set forth which can be produced with particular economy and will have long life under operative conditions.

It is still another object of the present invention to provide a gasket of the class set forth which may be installed, or replaced when changes in installation so require, without any requirement for special tools, equipment, or skilled labor.

Further objects and advantages of the invention will be readily apparent from the following description, taken in conjunction with the accompanying drawing, wherein:

FIG. 1 is a side elevational view of a novel gasket produced in accordance with the present invention, a portion thereof being broken away for purposes of clarity;

FIG. 2 is a longitudinal sectional view through a pair of adjacent pipe sections, located for telescopic assembly, the novel gasket being positioned upon the male extremity of one of said pipe sections;

FIG. 3 is a longitudinal sectional view of the adjacent pipe sections of FIG. 2, the telescopic union therebetween having been completed, illustrating the unique deformation of the gasket which results in the formation of a fluidproof joint between the pipe sections;

FIG. 4 is a fragmentary detail sectional view, on an enlarged scale, illustrating the configuration of the gasket of FIGS. 1, 2 and 3;

FIG. 5 is a fragmentary detail sectional view, on an enlarged scale and similar to FIG. 4, illustrating a modified form of gasket; and FIG. 6 is a fragmentary detail sectional view, also on an enlarged scale, illustrating a further modified form of gasket.

As shown in the drawings, particular reference being had to FIGS. 1 through 4, the novel gasket 10 of the present invention comprises a pair of spaced rings 11 and 12 which are connected by a substantially thinner weblike portion 13. Desirably, the web portion 13 is angularly disposed and merges into the upper circumferential periphery of the ring 11 as at 11a and into the lower circumferential periphery of the ring 12 as at 12a. It will be understood that the rings 10 and 11, and also the web 12, are produced from elastomeric material (such as neoprene rubber or the like) having requisite characteristics of both flexibility and compressibility for reasons which will be discussed more fully hereafter.

The rings 10 and 11 are substantially circular in cross-sectional configuration and the size thereof, as well as the diameters, will vary in accordance with the dimensions of the joint being produced. It is essential, however, that the thickness of the ring 11 be slightly greater than the space or clearance between the telescopic elements being joined. The spacing between the rings 10 and 11 is critical and should be no less than one-half of the sum of the circumferences of the cross-sectional configurations of the two ring sections between which the web 12 extends.

Desirably, the complete peripheral surface of the gasket 10 is knurled circumferentially as indicated at 10a, the knurling on the web portion 13 being parallel and uniformly spaced so as to mesh readily with the knurling on the ring portions 11 and 12.

In installation, as shown in FIGS. 2 and 3 of the drawing, the gasket 10 is placed upon the male extremity of the pipe section 14 and the belled extremity 15a of the pipe section 15 is aligned therewith. The male extremity of the pipe section, with the gasket 10 mounted thereupon a shown, is then forced into the female or belled extremity 15a of the pipe section 15 which has been formed to provide a 10 percent to 30 percent interference with the gasket installation.

Since the thickness of the gasket front ring portion 12 is slightly greater than the annular space between the adjacent pipe sections, the internal peripheral wall of the belled extremity 15a contacts the knurled surface of the gasket ring 12 as the two sections of pipe are brought together. This results in the dragging of the rear ring section 11 toward the front ring section as the result of increasing tension on the connecting web portion 13. Simultaneously therewith the web 13 is partially wrapped around the ring portion 12 as shown at 13a in FIG. 3, thereby further compressing the front ring section until a maximum self-adjusting interference is established. When the rear ring section 11 becomes involved in the compressing forces developed, it experiences the same type of self-adjustment, this also being illustrated in FIG. 3 of the drawing.

It will be readily apparent that the kinetic energies built up through the telescopic installation described hereabove result in a progressive increase in sealing force of the novel gasket disclosed herein whereby fluidproof joints may be created which will remain completely effective unless the installation per se is disturbed.

While the rings 11 and 12 have been illustrated and described as of substantially identical thicknesses, it will be understood that the front ring may be of lesser thickness than the rear ring by reason of the large draft angles usually employed in single and double-belled extremities of large diameter pipes.

The gasket 10 of the present invention may be molded readily as a complete ring as has been shown in FIG. 4 of the drawing. However, if desired, and as shown in FIG. 5 of the drawing, the ring sections 21 and 22 may be molded and the web section 23 may be produced separately, as by extrusion, or the like, and joined to the rings 21 and 22 by heat sealing, vulcanization, or a similar process, as indicated at 21a and 22a.

Further, in the modified form of the invention illustrated in FIG. 6 of the drawing, one or both of the rings 31 and 32 may be hollow to provide for more ready deformation, as indicated respectively at 31a and 32a, and the web portion 33 may be produced integrally therewith or attached thereto as discussed hereabove in connection with FIG. 5 of the drawing.

It also is contemplated that, under certain conditions, a single knurled ring having a complementarily knurled web portion extending therefrom may be utilized with entirely satisfactory results.

The knurling employed may be coarse or fine as desired and should have direct relationship to the size of the gasket and cross-sectional diameter of the ring or ring sections.

It will be obvious that pipe joints or other telescopic assemblies produced with the novel gasket of the present invention will have a substantial degree of flexibility, will not be affected adversely as by vibratory influences, and will permit a substantial degree of tolerance in creating a sealed and fluidproof connection.

It will be obvious to those skilled in this art that various changes may be made without departing from the spirit and scope of the invention and reference therefore is made to the claims for summaries of the novel features of construction and of the essentials of the invention for all of which protection is desired.

We claim:

1. A flexible and compressible gasket including a pair of spaced end rings, each having a substantially round cross-sectional configuration, and a web portion connecting said end rings, the thickness of said web portion being substantially less than the thickness of said end rings, the surfaces of said end rings and web portion being circumferentially and uniformly knurled.

2. A gasket as set forth in claim 1 where the spacing between said end rings is at least one-half of the sum of the circumferences of the cross-sectional configurations of said end rings.

3. A gasket as set forth in claim 2 where said web portion is angularly disposed and one extremity of said web portion merges with the upper circumferential periphery of one of said end rings and the other extremity of said web portion merges with the lower circumferential periphery of the other of said end rings.

4. A gasket as set forth in claim 3 where said web portion is produced separately and the respective extremities thereof are joined to said end rings.

5. A gasket as set forth in claim 2 where said web portion is formed integrally with said spaced end rings.

6. A gasket as set forth in claim 2 where at least one of said end rings is hollow.

7. A gasket as set forth in claim 2 where the knurling on the web portion is parallel and uniformly spaced and complementary to the knurling on each of said spaced end rings whereby when one of said end rings is rolled upon said web portion the knurls of said end ring will mesh with the knurls of said web portion.

8. A gasket as set forth in claim 2 where the thickness of the first of said end rings is less than the thickness of the second of said end rings.